United States Patent [19]

Siegenthaler

[11] Patent Number: 5,383,992
[45] Date of Patent: Jan. 24, 1995

[54] METHOD AND DEVICE FOR PRODUCING A TOROIDAL ROAD VEHICLE TIRE CARCASS

[75] Inventor: Karl J. Siegenthaler, Rome, Italy

[73] Assignee: Bridgestone Corporation, Tokyo, Japan

[21] Appl. No.: 991,844

[22] Filed: Dec. 16, 1992

[30] Foreign Application Priority Data

Dec. 30, 1991 [IT]  Italy .............................. TO91A001049

[51] Int. Cl.⁶ .............................................. B29D 30/00
[52] U.S. Cl. ..................................... 156/117; 156/397; 152/563; 152/548
[58] Field of Search ...................... 156/117, 394.1, 397, 156/398, 362 R, 125, 326; 152/548, 552, 558, 560, 563, 562, 357, 358, 362; 139/1 R, 117

[56] References Cited

U.S. PATENT DOCUMENTS

| | | | |
|---|---|---|---|
| 522,814 | 7/1894 | Welch | 152/563 |
| 649,720 | 5/1900 | Duryea | 152/563 |
| 670,413 | 3/1901 | Tillinghast | 152/563 |
| 797,138 | 8/1905 | Marshall | 152/563 |
| 1,170,597 | 2/1916 | Archer | 152/558 |
| 1,259,997 | 3/1918 | Kline | 156/117 |
| 3,815,652 | 6/1974 | Pouilloux | 152/548 |
| 3,935,894 | 2/1976 | Pouilloux | 152/552 |
| 4,277,295 | 7/1981 | Schmidl | 156/117 |
| 4,830,781 | 5/1989 | Oswald | 152/548 |

FOREIGN PATENT DOCUMENTS 0489353  10/1992  European Pat. Off. ............. 156/117

*Primary Examiner*—Clifford D. Crowder
*Assistant Examiner*—Larry D. Worrell, Jr.
*Attorney, Agent, or Firm*—David A. Thomas

[57] ABSTRACT

A method and device for producing a toroidal road vehicle tire carcass, the carcass presenting an annular frame rotated about its axis in relation to a knotting device located outside the frame and employing two continuous cords for producing, on the frame, a number of substantially radial, elongated reinforcing elements, each defined by a loop. Each loop is formed by winding in a U, an intermediate portion of a respective cord, wound about a respective annular bead forming part of the frame, and which is drawn towards the other bead and connected to a corresponding loop in the other cord to form with the same a reticulated "boucle" structure enclosing the two beads.

12 Claims, 3 Drawing Sheets

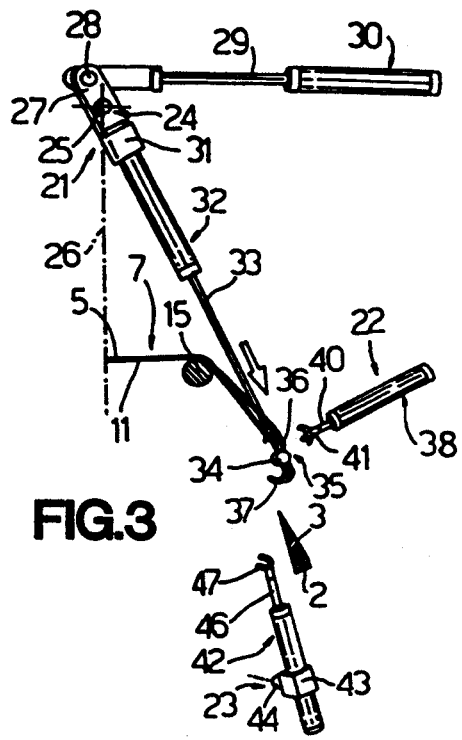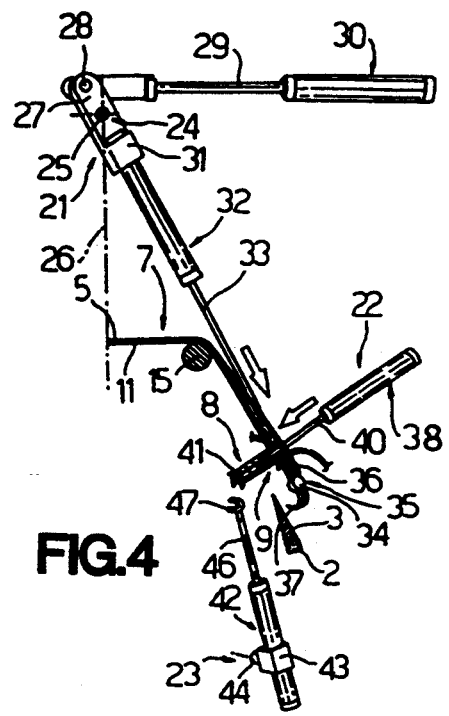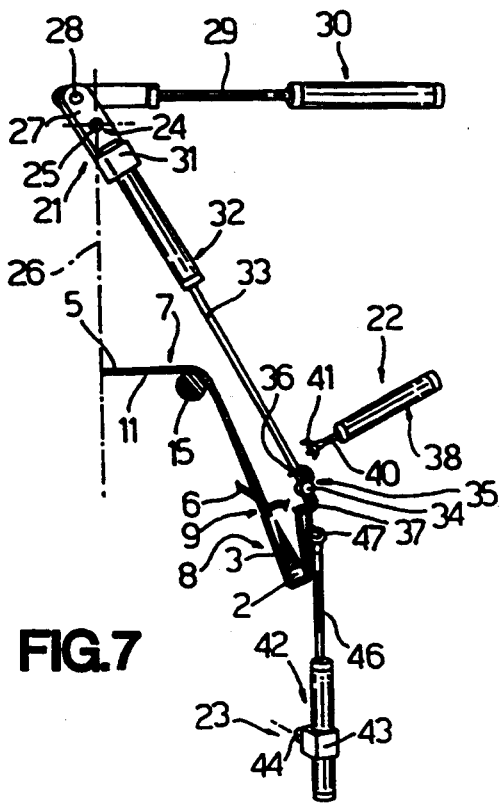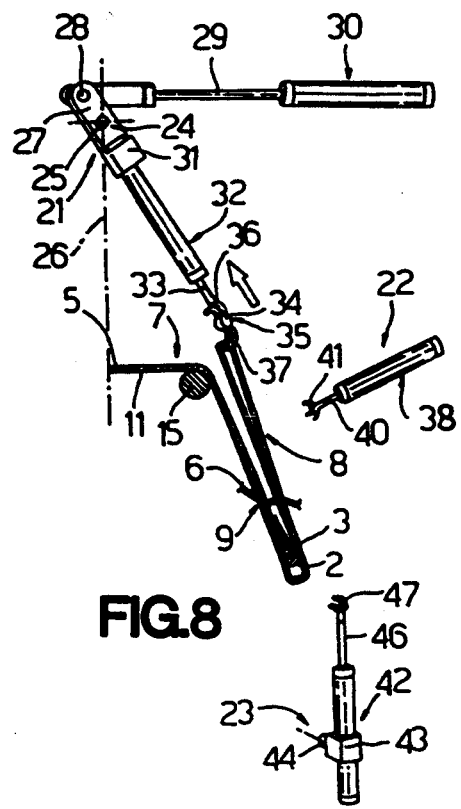

5,383,992

METHOD AND DEVICE FOR PRODUCING A TOROIDAL ROAD VEHICLE TIRE CARCASS

BACKGROUND OF THE INVENTION

Technical Field

The present invention relates to a method of producing a toroidal road vehicle tire carcass. In particular, the present invention relates to a straightforward, low-cost method of producing a toroidal radial tire carcass comprising two annular beads connected by a reticulated structure comprising a number of elongated reinforcing elements connecting and extending substantially radially in relation to the beads.

SUMMARY OF THE INVENTION

According to the present invention, there is provided a method of producing a toroidal road vehicle tire carcass comprising two coaxial annular beads, and a number of elongated reinforcing elements extending between and substantially radially in relation to the two beads. The method is characterized by the fact that it comprises a stage consisting in forming a toroidal frame supporting said carcass and comprising said beads; and in winding successive intermediate portions of at least two cords substantially in a U, and engaging said intermediate portions by means of a knotting device outside said supporting frame, so as to form on said frame, two series of said elongated reinforcing elements, each element being defined by a loop. The knotting device and the supporting frame is rotated in relation to each other about an axis parallel to the bead axis. Each loop in each of said series is engaged by said knotting device, wound about a respective bead, drawn towards the other bead, and connected to a respective loop in the other series to form a toroidal reticulated "boucle" structure enclosing the two beads.

In the above method, the supporting frame preferably comprises an inner portion defined by the two beads; and a removable auxiliary outer portion located between and radially outwards in relation to the two beads. The outer portion is rotated about said axis together with the inner portion, and the elongated reinforcing elements are placed outside the auxiliary outer portion.

The present invention also relates to a device for producing a toroidal road vehicle tire carcass of the aforementioned type.

According to the present invention, there is provided a device for producing a toroidal road vehicle tire carcass comprising two coaxial annular beads, and a number of elongated reinforcing elements located between and extending substantially radially in relation to the beads. The device is characterized by the fact that it comprises a frame supporting said carcass and comprising said beads; a knotting device for connecting at least two continuous cords; and a supporting device for supporting and rotating said frame about its axis and in relation to the knotting device. The knotting device is located outside the frame, and comprises conveying means for engaging an intermediate portion of a respective one of said cords, and forming on the frame, a number of said elongated reinforcing elements. Each element is defined by a loop produced by said conveying means winding an intermediate portion of a respective cord in the form of a U. The conveying means operate in such a manner as to wind said loop about a respective one of said beads, draws said loop towards the other bead, and connects it to a respective one of the loops in the other cord, so as to form, with said loop, a toroidal reticulated "boucle" structure enclosing the two beads.

BRIEF DESCRIPTION OF THE DRAWINGS

A non-limiting embodiment of the present invention will be described by way of example with reference to the accompanying drawings, in which:

FIG. 3 shows a half cross section of a preferred embodiment of the device according to the present invention; and FIGS. 4 to 10 show the FIG. 3 device in successive operating stages.

BEST MODE FOR CARRYING OUT THE INVENTION

Figure 1:
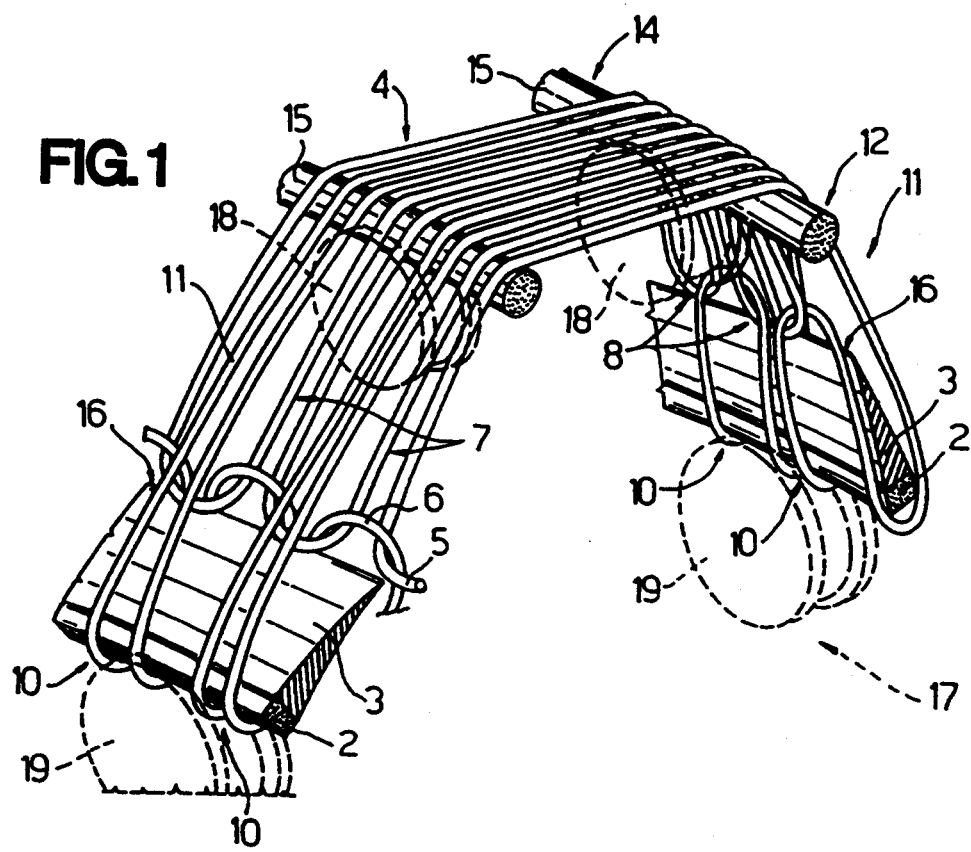
FIG. 1 shows a schematic view in perspective of a portion of a carcass produced using the method according to the present invention.
Figure 2:
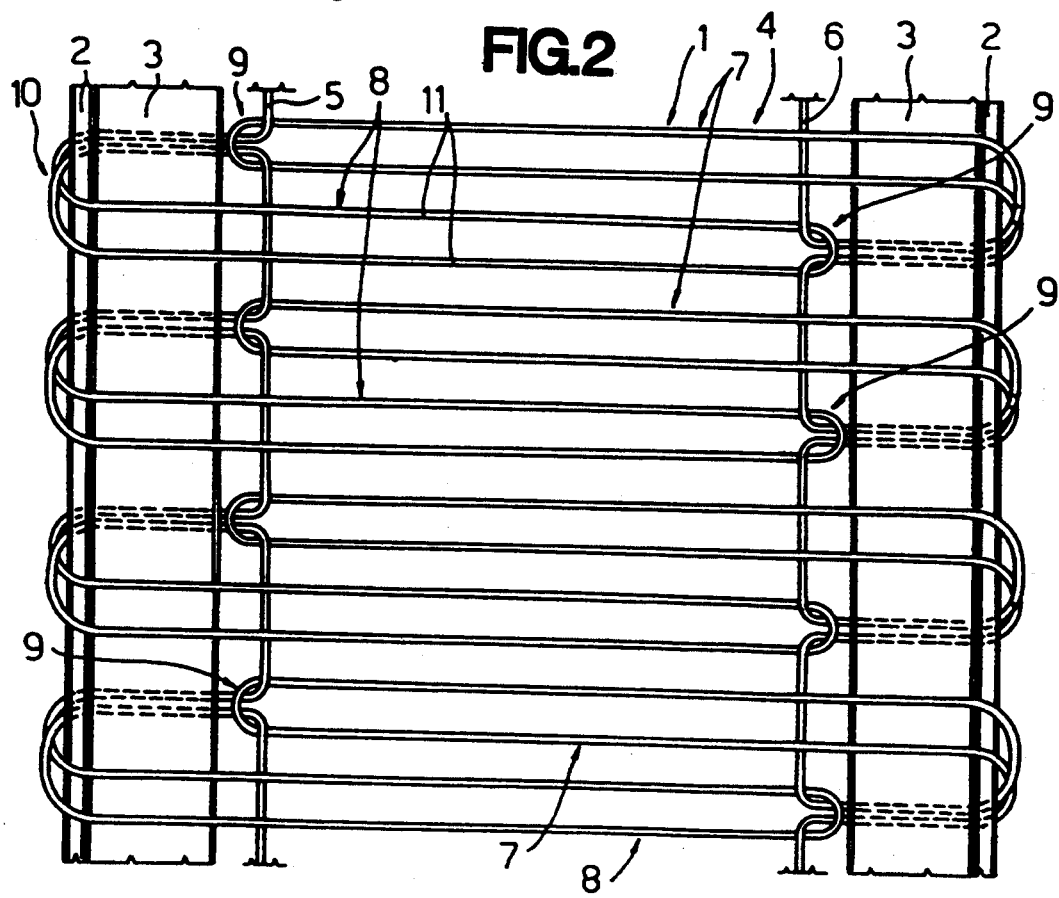
FIG. 2 shows a schematic plan view of the carcass portion in FIG. 1.
Figure 5:
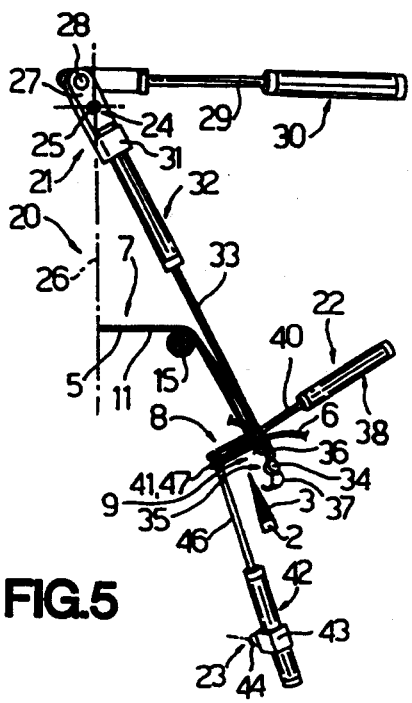

Number 1 in FIG. 1 indicates a toroidal road vehicle tire carcass.

Carcass 1 comprises two annular beads 2 with respective bead fillers 3, and a toroidal reticulated structure 4 connecting beads 2. Structure 4 comprises a number of reinforcing elements extending between and substantially radially in relation to beads 2.

In the example shown, said reinforcing elements are formed from a first and a second continuous cord 5 and 6 respectively, wound so as to form a first and second continuous series of oppositely-oriented U-shaped loops 7 and 8, respectively.

According to a variation not shown, cords 5 and 6 are connected to form a single continuous cord. Alternatively, according to further variations not shown, the carcass may be divided into a number of sectors, each formed using one or two cords.

Each loop 7 and 8 is linked at 9 to a respective loop 8 and 7, respectively, in the other series, to weave a substantially tubular structure 4 enclosing beads 2. Each link 9 in loops 7 and 8 is located along the inner surface of reticulated structure 4, close to respective bead 2, and is formed by inserting one of the loops 7 or 8 through the other loop 8 or 7, so as to form a so-called "boucle" structure 4.

Each loop 7 and 8 comprises a first portion 10 extending from link 9 about adjacent bead 2; and a second U-shaped end portion 11 is wound towards the other bead 2.

Carcass 1 as described above is formed on a supporting frame 12 comprising an inner portion 13 defined by beads 2. A removable auxiliary outer portion 14 is defined by two rings 15, each consisting of a number of curved segments connected in a releasable manner (not shown). Portion 14 is located between and radially outwards in relation to beads 2, so as to define with beads 2, two annular openings 16.

As shown in FIG. 1, frame 12 is mounted for rotation on a supporting device 17 comprising a first number of rollers 18, and a second number of rollers 19, at least one of which is powered (in FIG. 1, only one of rollers 18 and 19 in each number is shown). Rollers 19 are arranged about two first coaxial circumferences for supporting beads 2 coaxially and in a rotary manner. Rollers 18 are arranged about two second circumferences coaxial with each other and with said first circumferences, for supporting rings 15 in a rotary manner and coaxial with each other and with beads 2. When activated, the drive roller 18 and 19 in each number rotates frame 12 at substantially constant angular speed about its axis (not shown) and in relation to a fixed knotting device 20 (FIG. 10) outside frame 12.

Figure 10:
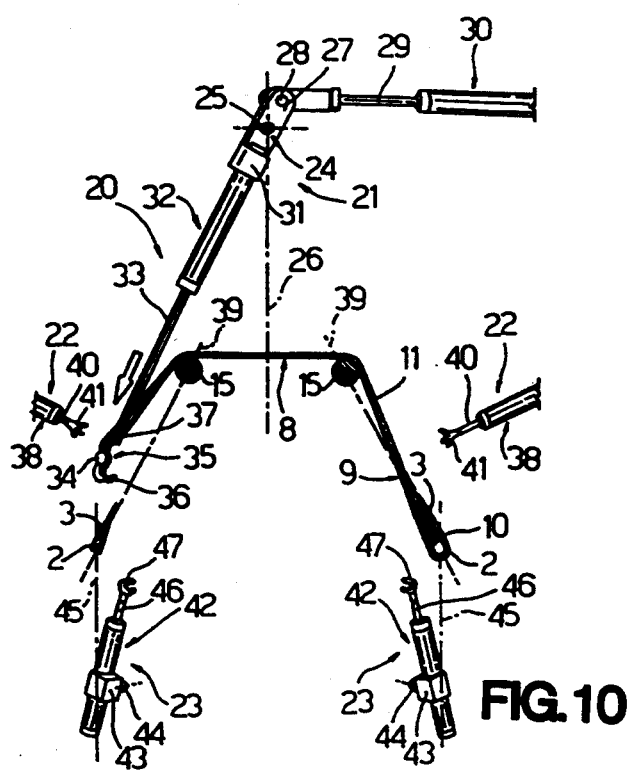

As shown in FIG. 10, knotting device 20 comprises a number of conveyor units for engaging and weaving cords 5 and 6 to form structure 4. In particular, knotting device 20 comprises a first central conveyor unit 21 located radially outwards of and centrally in relation to frame 12. For each bead 2, a second lateral conveyor unit 22 is located laterally outwards of frame 12, adjacent to bead 2, and halfway between bead 2 and respective ring 15. A third inner conveyor unit 23 is located radially inwards of bead 2.

As shown in FIG. 10, central unit 21 comprises a rocker arm 24 pivoting about a pin 25 mounted on a fixed support (not shown) perpendicular to the axis (not shown) of frame 12, and located in the axial plane of symmetry 26 of frame 12. Rocker arm 24 comprises a first arm 27 facing outwards in relation to frame 12. The free end of the output rod 29 of an actuator 30 is hinged to rocker arm 24 by means of a pin 28 parallel to pin 25. Actuator 30 is hinged to said fixed support (not shown) and substantially perpendicular to plane 26, for swinging rocker arm 24 in a controlled manner in the FIG. 10 plane perpendicular to plane 26. Rocker arm 24 also comprises a second arm 31 fitted on its free end with the body of an actuator 32, substantially coaxial with arm 31 and facing frame 12. Actuator 32 presents an output rod 33 fitted on its free end with a pin 34 parallel to pin 25, and connected for rotation to the center line of a rocking hook element 35, defined by two opposed hooks 36 and 37 facing frame 12.

Each lateral unit 22 comprises an actuator 38, the body of which is connected integral with said fixed support (not shown) facing and substantially perpendicular to a conical surface 39 tangent to respective bead 2 and ring 15. The output rod 40 of actuator 38 moves through conical surface 39, and presents an end fork 41 facing frame 12.

Each inner unit 23 comprises an actuator 42, the body of which is connected integral with a bracket 43 and is fitted with a powered pin 44 substantially parallel to pin 25. Pin 44 is connected for rotation to said fixed support (not shown) substantially on surface 45 coplanar with respective bead 2. Actuator 42 presents an output rod 46 facing respective bead 2, and has an end fork 47 facing frame 12.

During the formation of structure 4, frame 12 is rotated about its axis by rotating rollers 18 and 19. Structure 4 is woven about the two beads 2 and over the outside of portion 14 by knotting device 20, as described below with reference to FIGS. 3 to 10.

As shown in FIG. 3, rocker arm 24 of central unit 21, after being moved leftward in FIG. 3 into a hook-up position (not shown) wherein hook 36 of element 35 engages an intermediate portion of cord 5, is rotated anticlockwise in FIG. 3 about the axis of pin 25 by actuator 30, so as to move element 35 through plane 26. At the same time, actuator 32 is operated so as to first withdraw and then extract rod 33, and so wind loop 7, formed by hook 36 drawing said intermediate portion of cord 5, over the outside of rings 15 and towards bead 2 to the right in FIG. 3, hereinafter referred to as the "first bead."

As shown in FIG. 4, when the U-shaped end of loop 7 is carried by rod 33 past rod 40 of lateral unit 22 relative to first bead 2, actuator 38 of said unit 22 is operated so as to engage the intermediate portion of cord 6 by means of fork 41, and forms it into a loop 8, one end of which is inserted through loop 7 held taut by hook 36. In this connection, it should be pointed out that each hook 36 and 37 is a double hook for maintaining a wide loop, facilitating insertion as described above.

Figure 6:
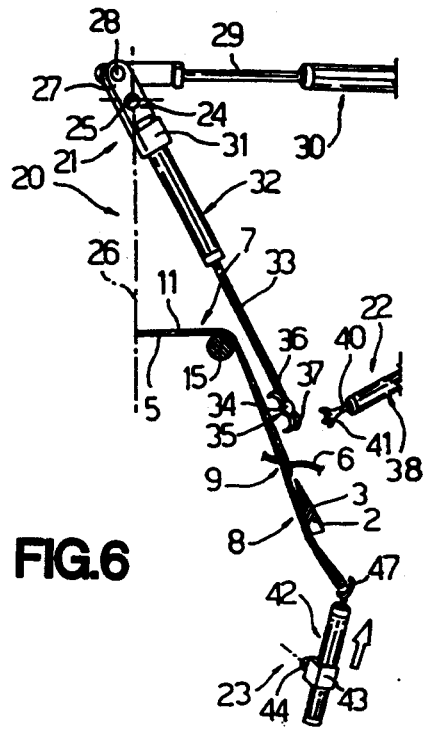
Figure 9:
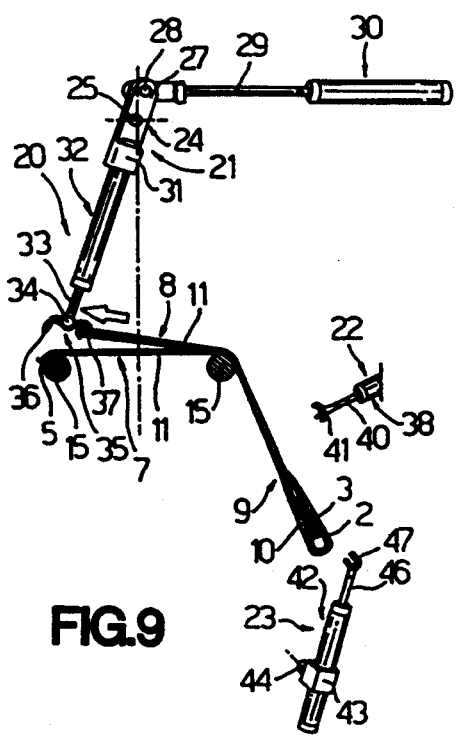

Fork 41, continuing through respective surface 39, stops (FIG. 5) in a position wherein the end of newly formed loop 8 is engaged by fork 47 on rod 46 of a respective inner unit 23. Fork 47 detaches loop 8 from fork 41, and, by means of actuator 42 and simultaneous oscillation of pin 44, winds loop 8 about respective bead 2 (FIG. 6). In so doing, inner unit 23 detaches loop 7 from hook 36, and draws the end of loop 7 inwards of frame 12 through opening 16, to form a link 9 inwards of surface 39 and close to a respective bead filler 3.

Fork 47 continues moving about bead 2 and outwards through surface 45 into a position (FIG. 7) wherein the end of loop 8 is engaged by hook 37 of central unit 21.

Rod 33 is then withdrawn (FIG. 8) to draw loop 8 up to the outer edge of frame 12, at which point, actuator 30 is operated (FIG. 9) so as to swing actuator 32 leftwards in FIGS. 2 to 10, and wind loop 8 over the outside of rings 15 and towards the other bead 2 into the FIG. 10 position. At this point, the other lateral unit 22 is activated for inserting a further loop 7 through the newly formed loop 8, which loop 7 is wound about a respective bead 2 and towards the other bead 2, as already described.

Successive operation of units 21, 22 and 23, combined with rotation of frame 12 about its axis, results in the gradual formation, on frame 12, of a toroidal reticulated structure 4, which is obviously completed by knotting the respective opposite ends of cords 5 and 6.

The formation of structure 4 is therefore enormously simplified by hook element 35, which, pivoting in idle manner about pin 34, provides for constant tensioning and relatively straightforward engagement and release of loops 7 and 8.

Moreover, each loop 7 and 8 is wound about a respective bead 2, and extends over the outside of frame 12 and through opening 16 opposite a respective bead 2 in relation to portion 14, so as to produce a woven tubular structure 4 enclosing beads 2.

In connection with the above, it should be pointed out that, as with any boucle structure, each loop 7 and 8 is produced by winding an intermediate portion of a cord into a U. In other words, structure 4 may be produced using one cord 5 or 6 with one free end, and by winding a first intermediate portion of said cord 5 or 6 into a U to produce a first loop 7 or 8, and then winding further intermediate portions of cord 5 or 6 into further loops 7 or 8 on the opposite side of said first intermediate portion in relation to said free end. That is, structure 4 may be produced from a so-called "infinite" cord 5 or 6, e.g. a cord 5 or 6 produced continuously, as it is used up, by a die (not shown) adjacent to frame 12.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of producing a toroidal road vehicle tire carcass comprising two coaxial annular beads, and a plurality of elongated reinforcing elements having a first portion, and an intermediate portion between and extending substantially radially in relation to the two beads; said method comprising the steps of providing a knotting device; and a support frame forming a toroidal frame supporting said carcass and said beads; winding successive parallel intermediate portions of a cord substantially in a U to form a portion of said elongated reinforcing elements; engaging said intermediate portions by means of a knotting device outside said supporting frame, so as to form, on said frame, two series of said elongated reinforcing elements extending completely outside of the support frame, each element being defined by a loop; rotating the knotting device and the supporting frame in relation to each other about an axis parallel to the bead axis; engaging each loop in each of said series by said knotting device, and winding each of said loops completely about a respective bead, and drawing each of said loops towards the other bead, and connecting each loop to a respective loop in the other series via a interconnecting link to form a toroidal reticulated looped structure enclosing the two beads.

2. A method as claimed in claim 1, in which the supporting frame comprises an inner portion defined by said two beads, and a removable auxiliary outer portion located between and radially outwards in relation to the two beads; rotating said outer portion about said axis together with said inner portion; and drawing said elongated reinforcing elements externally over said auxiliary outer portion.

3. A method as claimed in claim 1, including a series of operating cycles, each in turn comprising the steps of engaging an intermediate portion of a first of said cords close to a first of said beads; drawing said intermediate portion of said first cord externally over said auxiliary outer portion towards a second of said beads, so as to form a first said loop having a substantially U-shaped front end and defining a first elongated reinforcing element; engaging an intermediate portion of a second of said cords close to the second bead; inserting said intermediate portion of said second cord through said first loop so as to form a second loop having a substantially U-shaped front end; inserting said second loop through a first opening between the second bead and said auxiliary outer portion; and winding said second loop about the second bead, so as to draw said second loop towards the first bead and define a second elongated reinforcing element; the next cycle providing for inserting a further first loop through the second loop and a second opening between the first bead and said auxiliary outer portion, and for winding the further first loop about the first bead and towards the second bead to define a further said first elongated reinforcing element.

4. A method of producing a toroidal road vehicle tire carcass comprising two annular beads connected by a reticulated structure in turn comprising a number of elongated reinforcing elements located between and extending substantially radially in relation to the two beads: said method comprising the steps of providing a first conveyor unit having a first hook means and a second hook means forming a toroidal frame comprising an inner portion consisting of said beads, and an outer annular portion coaxial with and outwards of said beads; and a series of operating cycles, each comprising the steps of engaging an intermediate portion of a first cord close to a first of said two beads, via said first hook means of said first conveyor unit; moving said first conveyor unit towards a second of said two beads to form a first loop having a substantially U-shaped front end looped about said first hook means, which are arrested adjacent to said second bead to define, with said first loop, a first elongated reinforcing element; using further conveyor units adjacent to said second bead for inserting, from outside said frame, an intermediate portion of a second cord through the first loop to form a second loop, and for drawing and winding said second loop outwards about said second bead; engaging the second loop via said second hook means on the first conveyor unit; moving said first conveyor unit towards said first bead to further draw to said second loop; said second hook means being arrested adjacent to said first bead for defining, with said second loop, a second elongated reinforcing element, and for enabling insertion of a further first loop through said second loop.

5. A device for producing a toroidal road vehicle tire carcass comprising two coaxial annular beads, and a plurality of elongated parallel reinforcing elements located between and extending substantially radially in relation to the beads formed via at least two continuous cords; said device comprising a frame supporting said carcass and said beads; a knotting device for connecting at least two continuous cords; and a supporting device for supporting and rotating said frame about its axis and in relation to the knotting device; the knotting device being located outside the frame, and comprising conveying means for engaging an intermediate portion of a respective one of said cords, and forming, on the frame, a number of said elongated reinforcing elements, each element being defined by a loop produced by said conveying means winding an intermediate portion of a respective cord in the form of a U.

6. A device as claimed in claim 5, in which said conveying means comprises a first conveyor unit located outside and centrally in relation to said frame, and a second conveyor unit laterally outwards of and adjacent to each respective bead, and a third conveyor unit inwards of the respective bead; said conveyor units successively engaging each said loop.

7. A device for producing a toroidal road vehicle tire carcass comprising two coaxial annular beads, and a plurality of elongated parallel reinforcing elements located between and extending substantially radially in relation to the beads; said device comprising a frame supporting said carcass and said beads; a knotting device for connecting at least two continuous cords; and a supporting device for supporting and rotating said frame about its axis and in relation to the knotting device; the knotting device being located outside the frame, and comprising conveying means for engaging an intermediate portion of a respective one of said cords, and forming, on the frame, a number of said elongated reinforcing elements, each element being defined by a loop produced by said conveying means winding an intermediate portion of a respective cord in the form of a U; said conveying means comprises a first conveyor unit located outside and centrally in relation to said frame, and a second conveyor unit laterally outwardly of and adjacent to each respective bead, and a third conveyor unit inwards of the respective beads; said first conveyor unit comprising first hook means, and first actuating means for moving said first hook means about said frame between a position adjacent to one of said beads and a position close to the other of said beads; said first conveyor unit, said second conveyor unit and said third conveyor unit successively engaging each said loop.

8. A device as claimed in claim 7, in which each of said second conveyor units comprises second hook means, and second actuating means for moving said second hook means to and from a position inside said frame.

9. A device as claimed in claim 8, in which each of said third conveyor units comprises third hook means, and third actuating means for moving said third hook means between a position inside and a position outside said frame through the respective bead.

10. A device as claimed in claim 7, in which said first actuating means comprise a first actuator pivoting about a first axis substantially perpendicular to the axis of, and substantially in the axial plane of symmetry of, said carcass; and a second actuator connected to the first actuator for swinging it about said axis; said first actuator presenting a mobile output rod, and said first hook means being connected to the free end of said output rod.

11. A device as claimed in claim 7, in which said first hook means are connected to said first actuating means so as to rotate in relation to the same about a second axis substantially perpendicular to the axis of said carcass, and comprise two opposed integral hooks.

12. A device as claimed in claim 8, in which the supporting frame comprises an inner portion defined by said two beads, and a removable auxiliary outer portion between and radially outwards in relation to the two beads, so as to define, with the two beads, two annular openings; said second hook means being moved through a respective one of said annular openings by said second actuating means.

* * * * *